United States Patent
Buehrer et al.

(10) Patent No.: US 10,142,260 B2
(45) Date of Patent: *Nov. 27, 2018

(54) INQUIRY-BASED ADAPTIVE PREDICTION

(71) Applicant: International Business Machines Corporation, Armonk, NY (US)

(72) Inventors: Petra Sabine Buehrer, St. Leon (DE); Thomas H. Gnech, Herrenberg (DE); Joachim Rese, Hockenheim (DE); Holger J. Scheller, Meckesheim (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/839,541

(22) Filed: Dec. 12, 2017

(65) Prior Publication Data

US 2018/0102986 A1    Apr. 12, 2018

Related U.S. Application Data

(63) Continuation of application No. 14/941,546, filed on Nov. 14, 2015, now Pat. No. 9,887,935, which is a continuation of application No. 14/663,667, filed on Mar. 20, 2015, now Pat. No. 9,882,837.

(51) Int. Cl.
| | |
|---|---|
| *G06F 15/173* | (2006.01) |
| *H04L 12/911* | (2013.01) |
| *G06Q 10/06* | (2012.01) |
| *G06Q 30/02* | (2012.01) |

(52) U.S. Cl.
CPC ..... *H04L 47/823* (2013.01); *G06Q 10/06313* (2013.01); *G06Q 10/06315* (2013.01); *G06Q 30/0202* (2013.01); *H04L 47/822* (2013.01)

(58) Field of Classification Search
CPC ............. H04L 47/823; H04L 47/822; G06Q 10/06313; G06Q 10/06315; G06Q 30/0202
USPC ........................................................ 709/226
See application file for complete search history.

(56) References Cited

U.S. PATENT DOCUMENTS

| | | | | |
|---|---|---|---|---|
| 5,555,444 | A * | 9/1996 | Diekelman | H04B 7/18539 455/12.1 |
| 6,016,503 | A | 1/2000 | Overby, Jr. et al. | |
| 8,903,983 | B2 * | 12/2014 | Bakman | G06F 11/008 703/13 |
| 9,226,160 | B2 * | 12/2015 | Elrefaey | H04W 16/04 |
| 9,882,837 | B2 | 1/2018 | Buehrer et al. | |
| 9,887,935 | B2 | 2/2018 | Buehrer et al. | |
| 2008/0133767 | A1 * | 6/2008 | Birrer | H04L 65/4076 709/231 |

(Continued)

OTHER PUBLICATIONS

International Search Report and Written Opinion for PCTEP2016055716, dated Jun. 3, 2016, pp. 1-10.

(Continued)

*Primary Examiner* — Imad Hussain
(74) *Attorney, Agent, or Firm* — Heslin Rothenberg Farley & Mesiti P.C.

(57) ABSTRACT

Predicting future utilization of a resource. The predicting future utilization of a resource may include receiving inquiries for a potential future utilization of the resource for different future points in time, recording time-based patterns of the received inquiries, recording a historic actual utilization value of the resource, and determining a future utilization of the resource using the recorded time-based patterns of the received inquiries, the recorded historic actual utilization value of the resource and a current inquiry pattern of the resource.

8 Claims, 3 Drawing Sheets

(56) References Cited

U.S. PATENT DOCUMENTS

| | | | | |
|---|---|---|---|---|
| 2008/0175161 | A1* | 7/2008 | Amemiya | G08G 1/0104 370/252 |
| 2011/0010222 | A1* | 1/2011 | Choudhary | G06Q 10/06 705/7.37 |
| 2011/0035259 | A1* | 2/2011 | Das | G06Q 30/02 705/14.41 |
| 2012/0173477 | A1* | 7/2012 | Coutts | G06F 17/30306 707/602 |
| 2013/0046456 | A1* | 2/2013 | Scofield | G01C 21/3423 701/117 |
| 2013/0066646 | A1* | 3/2013 | Backhaus | G06F 19/327 705/2 |
| 2013/0268678 | A1* | 10/2013 | Subramanian | H04L 41/50 709/226 |
| 2013/0275685 | A1* | 10/2013 | Barbas | G06F 17/3048 711/137 |
| 2014/0006609 | A1* | 1/2014 | Gay | H04L 43/0876 709/224 |
| 2014/0032091 | A1* | 1/2014 | Arcot | G08G 1/0129 701/119 |
| 2014/0229022 | A1* | 8/2014 | Deivasigamani | G05D 7/0629 700/282 |
| 2015/0039660 | A1* | 2/2015 | Baptist | G06F 3/067 707/827 |
| 2016/0171521 | A1* | 6/2016 | Ramirez | G06Q 30/0224 701/409 |
| 2016/0171752 | A1 | 6/2016 | Ramirez et al. | |
| 2016/0226971 | A1* | 8/2016 | Barajas Gonzalez | H04L 67/1095 |

OTHER PUBLICATIONS

Anthony, Sebastian, "Audi Shows Off Next-Gen In-Car System That Can Predict the Future," Apr. 2013, pp. 1-7.

List of IBM Patents or Patent Applications Treated as Related, Jan. 19, 2018, 2 pages.

Buehrer Petra Sabine et al., "Inquiry-Based Adaptive Prediction," U.S. Appl. No. 15/839,481, filed Dec. 12, 2017, 29-pages.

* cited by examiner

INQUIRY-BASED ADAPTIVE PREDICTION

BACKGROUND

One or more aspects relate to predicting future utilization of a resource.

Predictive analytics and predictive forecasting are currently hot themes in the field of business intelligence or business analytics. They may be used to forecast revenue numbers or business results based on historic transaction data. However, the same technology may be used in systems for predictive maintenance and preventive customer service actions. The technology may also be used for forecasting potential bottlenecks in respect to computing resources, e.g., at the end of the calculation period when a large amount of consolidation calculations have to be made. All of these predictive systems have in common that an extrapolation in time is performed for a resource in question based on a historic real use of the resource in question.

There are several disclosures related to predicting utilization of a resource.

Document US 2012/0173477 A1, which is hereby incorporated by reference herein in its entirety, discloses systems and methods to monitor database system resource consumption over various time periods, in conjunction with scheduled data loading, data export and clearing operations. The additional activities may include generating a database system resource consumption map based on the monitoring, and digesting database system workload throttling to accommodate predictive database system resource consumption based on the resource consumption map and current system loading, prior to the current database resource consumption reaching a predefined critical consumption level.

Another document, US 2014/0006609 A1, which is hereby incorporated by reference herein in its entirety, is proposing a method for optimizing future resource usage in the cloud environment including first and second cloud services. Each cloud service is associated with at least one of technical and business restrictions defining a maximum capacity.

Document US 2013/0066646 A1, which is hereby incorporated by reference herein in its entirety, discloses a system configuration and techniques for optimizing schedules and associated use predictions of a multiple resource planning workflow. It may be applicable to environments, such as radiologist scheduling in a tele-radiology workflow, and may also provide forecasting and the generation of customized recommendations for scheduling and other resource scenarios. The forecast may be enhanced through the use of historical data models and estimated future data models.

It may be noted that the mentioned methods and systems rely on historic transactions actually making use of the resource. This may be equivalent to predicting future revenue numbers based on historic revenue numbers.

SUMMARY

According to one aspect, a method for predicting future utilization of a resource may be provided. The method may comprise receiving inquiries for potential future utilization of the resource for different future points in time; recording time-based patterns of the received inquiries; recording an actual historic utilization of the resource; and determining future utilization of the resource using the recorded time-based patterns of the received inquiries, the recorded actual historic utilization value of the resource and a current inquiry pattern for the resource.

Computer program products and systems relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE SEVERAL VIEWS OF THE DRAWINGS

Embodiments of the invention will now be described, by way of example only, and with reference to the following drawings.

DETAILED DESCRIPTION

Figure 1:
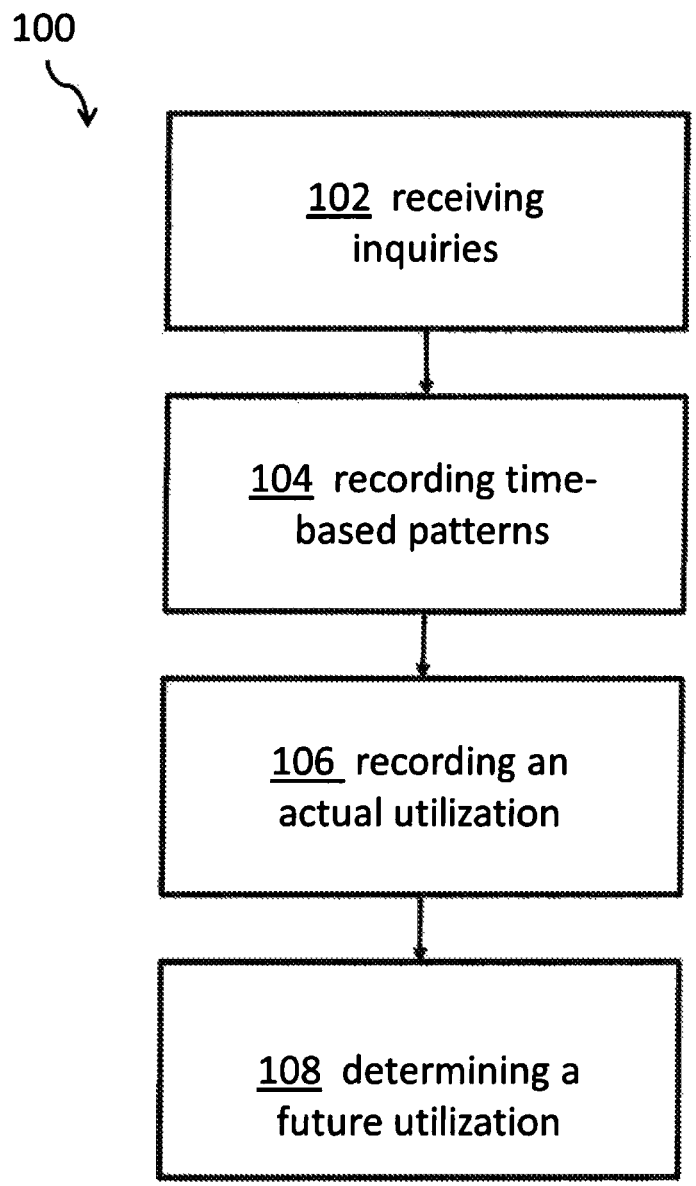
FIG. 1 shows one example of a block diagram of an embodiment of predicting utilization of a resource.

In the context of this description, the following conventions, terms and/or expressions may be used:

The term "resource" may denote any product, e.g. a computer component, or service that may be pre-ordered, used at a later time or, which price may vary according to a rareness of the resource.

The term "future point in time" may denote any time in the future compared to an actual time inquiries regarding the resource may be launched or a prediction may be performed.

The term "inquiry" may denote a request about information, e.g., an availability of the resource. It may also denote the availability of the resource for a certain price. It may also denote any information request about the resource. An inquiry is not a reservation for the request or a definitive booking of the request.

The term "potential future utilization" may denote an eventual usage of the resource. The resource may or may not be utilized by the inquirer. There may not be any relationship between the inquiry and the actual usage or utilization of the resource. The inquiry and the actual later utilization may be decoupled completely.

The term "time-based pattern", in particular of time-based patterns of inquiries, may denote a development of the number of inquiries for the resource over time. It may be noted that different sets of time based inquiry patterns may exist in parallel. One set of inquiries may be directed towards an interest in information about the resource at a first time in the future, and another set of inquiries may demonstrate an interest in information about the resource at a second time in the future. Both inquiry sets may not be intermixed because the inquiries may be independent from each other. An inquiry for a request at one future point in time may be another object than a request at another future point in time.

It may be noted that recorded, i.e., historic time-based patterns may be differentiated from a current pattern of inquiries. The current pattern of inquires may be defined as the pattern of inquires available at the point in time of the prediction.

The term "historic actual utilization" may denote the historic values of the utilization of the resource. Here, it may be noted that no parallel sets of utilization values may be required. A resource may only have one actual utilization value—representing a utilization rate—per time interval in the past.

The term "time dependent service" may denote any product or service with varying demand and varying number of orders or bookings per time unit. An inquiry for such a resource may, e.g., be visible by use of the Internet.

One or more aspects predict future utilization of the resource in question which is not only based on historic actual transactions regarding the utilization of the resource. In this, a historic transaction may comprise a request for the resource and consequently a fulfillment of the request. Thus, in systems and methods according to the state-of-the-art, there is a one-to-one relationship between a request and the fulfillment of the request for the resource.

One aspect proposed here does not only include requests and fulfillments of the requests, i.e., actual resource utilization for a resource. In contrast to conventional approaches, one or more aspects consider an interest in information about utilization of the resource, not necessarily the resource itself.

Thus, it is not the booking on which the prediction is based but, e.g., only the interest in a particular resource.

It may be noted that one aspect of the proposed technique is its adaptability. No background model of the predicted resource availability may be required. No assumptions need be made for any exception in the development of the availability of the resource. One or more aspects adapt itself to changing conditions. If the prediction system or method may be implemented as part of a road navigation system and a road-path may be partially blocked by road works, the system would implicitly consider the reduced capacity and would reflect that in the prediction.

An example from the stock market may make this more transparent. One way—or a plurality of ways—of predicting a future stock trading volume or stock price may be based on the historic development of the stock price which may include buy-side and sell-side orders which typically results—by way of supply and demand—in an actual stock price and/or trading volume. Other parameters may be reflected in the conventional predictive stock price systems, like general market dynamics, a development of stock prices of stocks of the same industry group, and so on.

However, all of these techniques may not reflect an abstract interest in the stock in question. Such an abstract interest may be made concrete by observing inquiries of the stock price over time. These inquiries may in many cases not lead to a purchase of a number of stocks; only a very small number of inquiries may lead to a stock purchase. These purchases may then represent the basis for the conventional predictive systems. However, and in contrast to the conventional prediction systems, the potentially far bigger number of inquiries of a stock price or trading volume may not be reflected in traditional prediction systems.

Thus, one or more aspects may deliver a more precise prediction of future resource utilization. One or more aspects may provide a more precise prediction of future resource utilization, which may not rely on historic transactions, like reservations, orders and requests for the resource.

According to one embodiment, the historic actual utilization or utilization value may be recorded as an average utilization value during discrete predefined time periods, in particular time periods in the past. The discrete value of a time slot may depend on the type of resource. A trading volume of stocks may be based in a second average; if the resource may be a sector of a motorway, the time slot for averaging may be a couple of minutes.

According to a further embodiment, the resource may be selected to be a part of a road-path, in particular a sector of a motorway or a specific crossing, from a first geo-position to a second geo-position. Thus, a navigation system, in which such a prediction system may be included, may plan ahead depending on the predicted usage of the sector of the motorway ahead. Thus, it may not only react to traffic messages reflecting the current traffic situation but plan ahead for the time to come during the journey with a vehicle.

According to one embodiment, the inquiring of potential future utilization of the part of the road-path may be regularly performed by a navigation system. In doing so, the navigation system may generate regular plan-ahead scenarios based on the prediction of the road-path usage. If a plurality of navigation systems in cars make the inquiries on a regular basis after a path from location A to location B has been planned, the prediction system may be able to foresee traffic congestion far in advance. The traffic, in particular the drivers via their extended navigation, may be informed in advance of a happening congestion. The road may have a much better utilization rate without congestion.

According to another embodiment, the determining the future utilization of the resource may also be based on a parameter reflecting external influence factors of the historic actual utilization. That may, e.g., be the hour of the day the resource is planned to be used, the day of the week, the season, the vacation period, the weather or the weather forecast, or any other environmental parameter that may influence the utilization or availability of the resource. Thus, an even more precise prediction also using heuristic algorithms or a rule based system considering one or more parameters that may be possible. The one or more parameters may influence the rule.

According to another embodiment, the resource may be selected to be a trading volume of stocks. If people may observe the stock price or the trading volume now and then using Internet platforms showing the actual trading volume or stock price, a prediction of a future trading volume or stock price at a given point in time in the future may be made.

According to another embodiment, the resource may be an availability of a time dependent service. Such a service may have different appearances. It may be an availability of a flight ticket for a flight from destination A to destination B at a given future time frame or a specific flight identifiable by a flight number. It may also apply for bookings for ferries, busses, concerts, theatre tickets and so on. The possibilities are unlimited. Any resource that may have a varying availability in the future and potentially a varying price, based on the demand and/or just interest, may be a target of the inquiry based prediction.

It may be noted that the prediction may not be performed on historic transactions like in a supply and demand system.

Furthermore, embodiments may take the form of a computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

It should also be noted that embodiments of the invention have been described with reference to different subject-matters. In particular, some embodiments have been described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, e.g., between features of the method type claims and features of the apparatus type claims, is considered as to be disclosed within this document.

The aspects defined above and further aspects of the present invention are apparent from the examples of embodiments to be described hereinafter and are explained with reference to the examples of embodiments, but to which the invention is not limited.

In the following, a detailed description of the figures will be given. All instructions in the figures are schematic. First, a block diagram of an embodiment of predicting future utilization of a resource is given. Afterwards, embodiments of the prediction system are explained.

FIG. 1 shows a block diagram of an embodiment of a method 100 for predicting future utilization of a resource in a future point in time. The shown method 100 comprises receiving, 102, inquiries for a potential future utilization of the resource for different future points in time. It may be noted that no fixed bookings or orders are received or recorded—the inquiry may just express an interest in the resource.

The method, as shown, also comprises recording, 104, time-based patterns of the received inquiries. The different patterns may comprise an amount of the number of inquiries over time for utilization of the resource for different given future points in time.

The method as shown also comprises recording, 106, an actual historic utilization, in particular in the form of a measurement value of the resource, and determining, 108, or calculating, based on a formula, future utilization of the resource using, for instance, the recorded time-based patterns of the received inquiries, the recorded actual historic utilization values of the resource and the current inquiry pattern for the resource.

Figure 2:
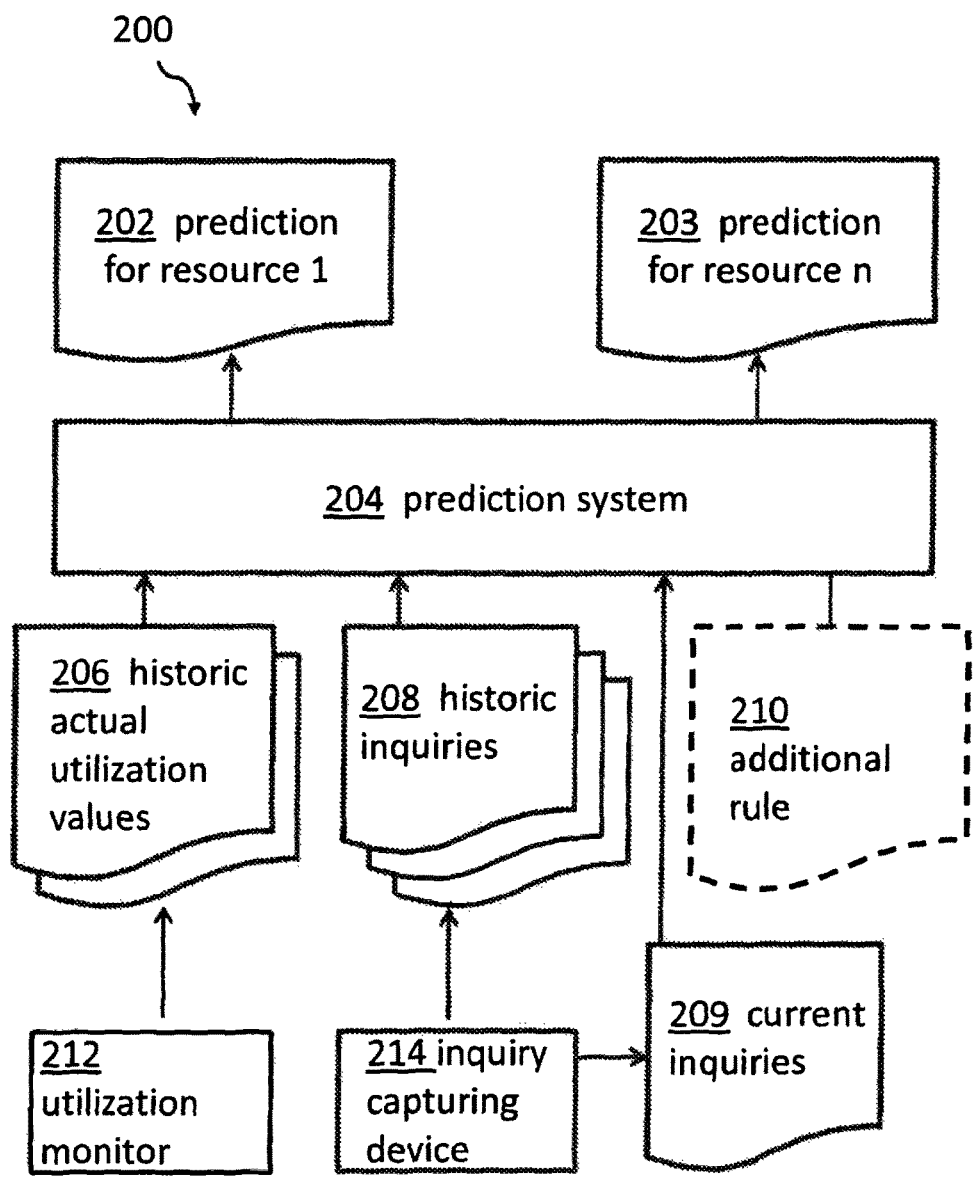
FIG. 2 shows one example of a block diagram of an embodiment of components involved in executing one or more aspects.

FIG. 2 shows a block diagram of an embodiment 200 of components involved in executing the method 100 for predicting future utilization of a resource. A prediction system 204 may use as input values measurement values of historic actual utilization values 206 of the resource. Additionally, the prediction system 204 may use the historic number of inquiries 208, i.e., a plurality of inquiries, the inquiries for utilization of the resource at a specific time in the future and current inquires 209 for the resource. Different inquiry patterns may exist in parallel for the same resource but for different points in time. The utilization rates of the resource may be determined based on a time interval which may depend on the kind of resource.

The prediction system 204 may also be adapted to manage and store the historic actual utilization values 206 as well as capturing the historic number of inquiries 208.

The prediction system 204 may also be adapted to perform predictions or determine future utilization of different resources 1 . . . n in parallel, 202, 203. Consequently, different sets of historic actual utilization values 206 may be managed and stored in parallel. Furthermore, a plurality of sets of received inquiries 208 and recorded time-based patterns of the received inquiries 209 may be managed and stored by the prediction system 204.

As output, the prediction system 204 may deliver the determined future utilization of the resource. Different predictions may be performed for different points in time in the future. Furthermore, the method may also comprise predicting future utilizations of a plurality of resources for different points in time, as indicated by a prediction for a plurality of resources 203.

The historic number of inquiries 208 may be captured by one or more inquiry capturing devices 214, whereas the historic actual utilization values 206 may be monitored and captured by one or more utilization monitor(s) 212. Furthermore, one or more additional rules 210 may be applied as input to the prediction system, e.g., influenced by parameters.

As one model of determining future utilization of a resource, the following example may be considered:

At a prediction time $t_{pred}$, the following historic actual utilization values 206 may have been recorded alongside with a number of inquiries at different times before that historic actual utilization value 206:

TABLE 1

| inquiry pattern | >1 Day | >6 h | >2 h | >1 h | >30 min - num | >15 min | all in-quiries | actual utilization (util) |
|---|---|---|---|---|---|---|---|---|
| current | 3 | 45 | 75 | 99 | 120 | | | P |
| historical t-1 | 4 | 37 | 97 | 143 | 180 | 270 | 340 | 72% |
| historical t-2 | 3 | 47 | 78 | 101 | 120 | 250 | 305 | 48% |
| historical t-3 | 2 | 25 | 53 | 78 | 90 | 176 | 203 | 18% |
| historical t-4 | 1 | 23 | 38 | 49 | 60 | 89 | 105 | 12% |

In this example, it is desired to know now (=point in time t), how the utilization of the resource (P) will be in 30 minutes from now.

The first row of the table above shows the current inquiry pattern. Up to now, 120 inquiries have been received. In this example, consider only the accumulated number of inquiries that have been received up to 30 min before the point of time at which the utilization is predicted (column with underlined values, >30 min). In order to predict the utilization of the resource in a future point in time, this example considers the 4 most recent historical patterns (t-1, t-4) and the corresponding recorded actual utilization values.

The utilization of the resource (P) may then be calculated as:

$$P = num \times sum(weight_{t-i} \times (util_{t-i}/num_{t-i}), i=1 \ldots 4,$$

wherein $weight_{t-i}$, $i=1, \ldots, 4$; $weight_1 + \ldots + weight_4 = 1$ are weights for historical data, that allows more recent data to contribute more to the calculation than older data.

Using weights of ½, ¼, ⅛, ⅛ results in:
$P=120\times(½\times72\%/180+¼\times48\%/120+⅛\times18\%/90+⅛\times12\%/60)=45\%$, the predicted utilization of the resource.

As a comparable model of determining future utilization of a resource, the following slightly adapted example may also be considered:

At a prediction time $t_{pred}$, the following historic actual utilization rates may have been recorded alongside with a number of inquiries for different times before that historic actual utilization:

TABLE 2

| number of inquiries | utilization of resource | at time before the prediction |
|---|---|---|
| 180 | 72% | −10 min. |
| 120 | 48% | −20 min. |
| 90 | 18% | −30 min. |
| 60 | 12% | −40 min. |

The table may be interpreted as follows: at a point in time t_h1 which equals $t_{pred}$ minus 10 minutes, i.e., 10 minutes before the current prediction time, the utilization was 72%; and, e.g., 30 minutes before t_h1 there have been 180 inquiries for the time t_h1. The second row may be interpreted in a similar way, i.e., for t_h2 which equals $t_{pred}$ minus 20 minutes; and so on.

It may be noted that for an inquiry or prediction not the actual utilization is used but the prediction is based on historical inquires for related historical utilizations.

Weighting factors may be used for determining a prediction of the utilization of the resource. Assume that the number of inquiries at the time of the prediction is 120 and that a prediction shall be made of utilization at a time 30 minutes in the future. Then, the predicted utilization may be determined using the following formula:

$$u_F = W * num_{inq}, \text{wherein}$$

$u_F$ = future utilization,
W = weighting factor, and
$num_{inq}$ = number of inquiries at prediction time for a fixed point in time in the future.

The weighting factor may be determined with experiments. Generally it may be assumed that the closer the utilization rates and captured inquiries are to the prediction time the higher the weighting may be. E.g., $W = \frac{1}{2}*(72\%/180) + \frac{1}{4}*(48\%/120) + \frac{1}{8}*(18\%/90) + \frac{1}{8}*(12\%/60)$. Please note that the numbers used are identical to the numbers used in the previous example. However, this does not have to be the case.

The factors in front of the brackets may be determined based on experience. The number in the brackets may easily be correlated with the values in table 1.

In this example a utilization rate of 45% may be determined:

$$u_F = 0.375 * 120 = 45\%.$$

However, any other determination model for the prediction based on the recorded inquiry patterns and the historic actual utilization value may be used.

In a more general form, an example of a determination algorithm for the prediction of utilization of a resource may be performed as follows:

Let n = number of records in historical data to be considered for a prediction.
Let $w_i$, i=1, ..., n where $i_1 + ... + i_n = 1$ represent weights for historical data (typically, lower when older).
Let $B_i$, i=1, ..., n be content of buckets stored in historical data.
Let U = set of possible values for utilization. For example U = (0% ... 100%) or U = ("green", "yellow", "red").
Let $a_i \in U$, i=1, ..., n be actual utilization stored in historical data.
Let u(x): N→U utilization function, i.e., enumeration of possible values.
Let b = content of relevant bucket in the sample.
Then, the prediction may be calculated as:

$$P = u(b \times sum(w_i \times (u^{-1}(a_i)/B_i), i=1 \ldots n)).$$

A couple of additional comments regarding the prediction method may make the concept more comprehensible. Since this sample of inquiries is continuously built from executed inquiries, the time difference δ between the prediction time $t_{pred}$ or $T_0$ and the target point in time T for the prediction is important for the prediction calculation. Therefore, each record in the sample of inquiries and the historical actual utilization rate also may contain δ. In order not to store every inquiry, each record may contain multiple buckets. Each bucket may represent a time range and may hold the aggregated number of inquiries that have been performed within this time range. Usually, the number of inquiries per time unit increases over time, i.e., when the target point in time T is approaching. Thus, buckets that represent the time range closer to T may hold a shorter interval. Examples of decreasing sample times may be as follows:
[>1 day], [>12 h], [>6 h], [>3 h], [>75 min.], [>30 min], [all].

For historical data, the relation between content of buckets and information about actually availability is evaluated. This relation is used to conclude a prediction from the content of the buckets in the sample. Historical data may not be considered anymore, if the data becomes too old. Those data may be deleted. The deletion time period may be redefined. Thus, the amount of historical data is basically constant.

Furthermore, more recent historical data may be considered more important and should influence the prediction more than older historical data. To do so, a factor called weight—as explained above—is used. More recent historical data appear with higher weights in the prediction formula.

Figure 3:
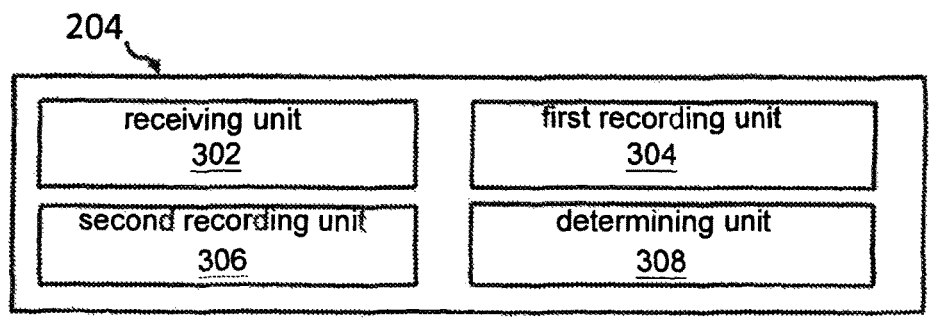
FIG. 3 shows one example of an embodiment of a prediction system.

FIG. 3 shows a block diagram of an embodiment of the prediction system 204 for prediction of future utilization of a resource in a future point in time. The prediction system 204 comprises a receiving unit 302 adapted for receiving inquiries on a potential future utilization of the resource for different future points in time, a first recording unit 304 adapted for recording time-based patterns of the received inquiries 208, and a second recording unit 306 adapted for recording a historic actual utilization value 206 of the resource. Furthermore, the prediction system 204 also comprises a determining unit 308 adapted for determining a future utilization of the resource using, for instance, the recorded time-based patterns of the received inquiries, the recorded historic actual utilization values 206 of the resource, and the current inquiry pattern for the resource.

The resource may be any service and/or product having a varying, time-based utilization and potentially a varying price for the service or products. This may apply to, e.g., tickets for a flight from a destination A to a destination B at a given time, theater tickets, bus seat tickets, a price of a stock, trading volume of a stock, ferry utilization, utilization of an IT resource in a computing center, utilization rate of seats in a football stadium for a given match, a part of a road-path from a destination A to a destination B, e.g., a critical crossing of a part of the path where road work is being performed, etc.

However, it should again be determined that the prediction does not rely on actual orders or reservations for a future utilization of the resource. The concept of the current prediction method and system relies on interest regarding the resource and/or past utilization of the resource. This interest is measured in number of inquiries for the availability of the resource at a given future point in time. Thus, the number of inquiries may be measured by the number of Internet connections from a client browser to a server requesting information about the resource in question.

Moreover, the automatic inquiries described in the context of the navigational system may also be performed in the context of any other utilization prediction of any other resource, e.g., stock trading volumes, database usage, ferry passages, concert tickets, etc. (see above).

Figure 4:
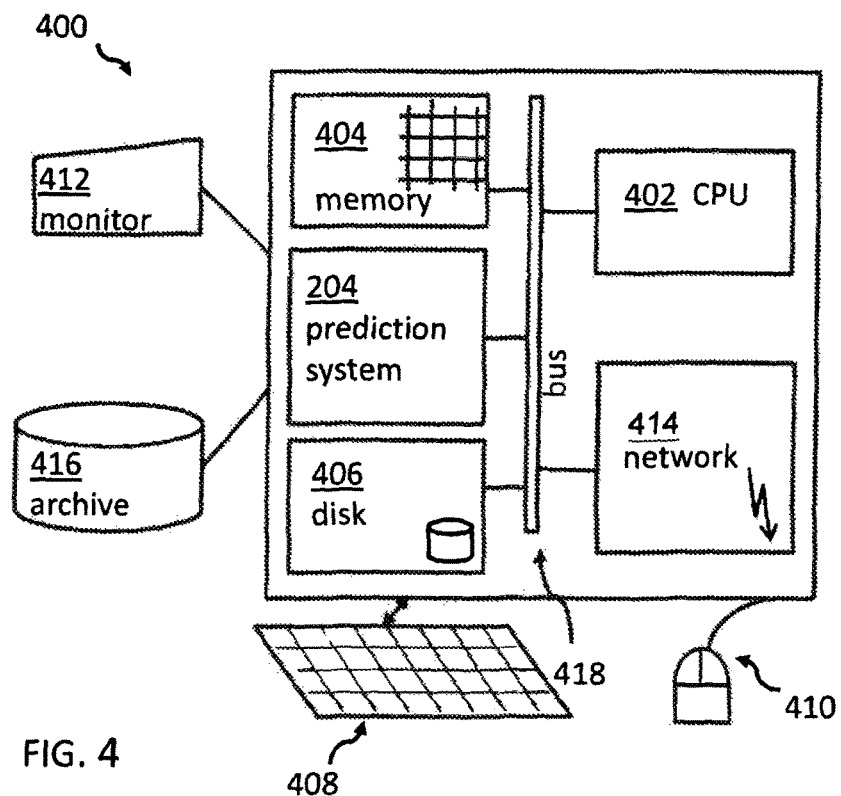
FIG. 4 shows an embodiment of a computing system comprising the prediction system.

Embodiments of the invention may be implemented together with virtually any type of computer, regardless of the platform, being suitable for storing and/or executing program code. For example, as shown in FIG. 4, a computing system 400 may include one or more processor(s) 402 with one or more cores per processor, associated memory elements 404, an internal storage device 406 (e.g., a hard disk, an optical drive, such as a compact disk drive or digital video disk (DVD) drive, a flash memory stick, a solid-state disk, etc.), and numerous other elements and functionalities, typical of today's computers (not shown). The memory elements 404 may include a main memory, e.g., a random access memory (RAM), employed during actual execution of the program code, and a cache memory, which may provide temporary storage of at least some program code and/or data in order to reduce the number of times, code and/or data must be retrieved from a long-term storage medium or external bulk storage 416 for an execution. Elements inside the computer 400 may be linked together by means of a bus system 418 with corresponding adapters. Additionally, the prediction system 204 may be attached to the bus system 418.

The computing system 400 may also include input means such as a keyboard 408, a pointing device such as a mouse 410, or a microphone (not shown). Alternatively, the computing system may be equipped with a touch sensitive screen as a main input device. Furthermore, the computer 400, may include output means such as a monitor or screen 412 (e.g., a liquid crystal display (LCD), a plasma display, a light emitting diode display (LED), or cathode ray tube (CRT) monitor). The computer system 400 may be connected to a network (e.g., a local area network (LAN), a wide area network (WAN)), such as the Internet or any other similar type of network, including wireless networks via a network interface connection 414. This may allow a coupling to other computer systems, or a storage network, or a tape drive. Those skilled in the art will appreciate that many different types of computer systems exist, and the aforementioned input and output means may take other forms. Generally speaking, the computer system 400 may include at least the minimal processing, input and/or output means, necessary to practice embodiments of the invention.

While the invention has been described with respect to a limited number of embodiments, those skilled in the art, having benefit of this disclosure, will appreciate that other embodiments may be devised, which do not depart from the scope of the invention, as disclosed herein. Accordingly, the scope of the invention should be limited only by the claims. Also, elements described in association with different embodiments may be combined. It should also be noted that reference signs in the claims, if any, should not be construed as limiting elements.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store, a program for use, by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that may communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions, which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions, which execute on the computer or other programmable apparatus, provide processes for implementing the functions/acts specified in the flowchart and/or block diagram, block, or blocks.

The block diagrams in the Figures illustrate the architecture, functionality, and operation of possible implementations of systems, methods and computer program products, according to various embodiments of the present disclosure. In this regard, each block in the block diagrams may represent a module, segment, or portion of code, which comprises one or more executable instructions for implementing the specified logical function(s). It should also be noted that, in some alternative implementations, the functions, discussed hereinabove, may occur out of the disclosed order. For example, two functions taught in succession may, in fact, be executed substantially concurrently, or the functions may sometimes be executed in the reverse order depending upon the functionality involved. It will also be noted that each block of the block diagrams, and combinations of blocks in the block diagrams, may be implemented by special purpose hardware-based systems that perform the specified functions or acts, or combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications, as are suited to the particular use contemplated.

What is claimed is:

1. A computer-implemented method comprising:
    predicting, by one or more processors, future utilization of a resource at a future point in time, the predicting comprising:
        receiving, by the one or more processors, inquiries on potential future utilization of the resource for different future points in time, wherein each inquiry comprising a portion of the inquiries is received over an Internet;
        recording, by the one or more processors, time-based patterns of the inquiries that are received to provide recorded time-based patterns of received inquiries;
        recording, by the one or more processors, an historic actual utilization value of the resource to provide a recorded historic actual utilization value; and
        determining, by the one or more processors, future utilization of the resource at a given future time using the recorded time-based patterns of received inquiries, the recorded historic actual utilization value of the resources, and a current inquiry pattern for the resource; and
    performing, by the one or more processors, an action on the resource in advance of the given time, based on the determined future utilization, wherein the action is selected from the group consisting of a maintenance action, a preventative customer service action, digesting workload throttling of a database system comprising the resource, and optimizing the resource for future usage.

2. The method of claim 1, wherein said historic actual utilization value is recorded as an average utilization value during discrete predefined time periods.

3. The method of claim 1, wherein the determining is based on a parameter reflecting an external influence factor of the historic actual utilization value.

4. The method of claim 1, wherein the resource is a time dependent service.

5. The method of claim 1, wherein the determined future utilization comprises a forecasted potential bottleneck.

6. The method of claim 1, wherein the resource comprises a database resource of the database system, the action comprises the digesting the database system workload throttling, and the given time comprises prior to current database resource consumption reaching a predefined critical consumption level.

7. The method of claim 1, wherein the resource comprises a computing resource in a shared multi-user computing environments and the action comprises the optimizing the resource for the future usage.

8. The method of claim 1, wherein the resource comprises a database resource of a database system and the action comprises generating a consumption map of the resource.

* * * * *